Jan. 16, 1934.    R. S. SANFORD    1,943,841
BRAKE
Filed Sept. 25, 1930
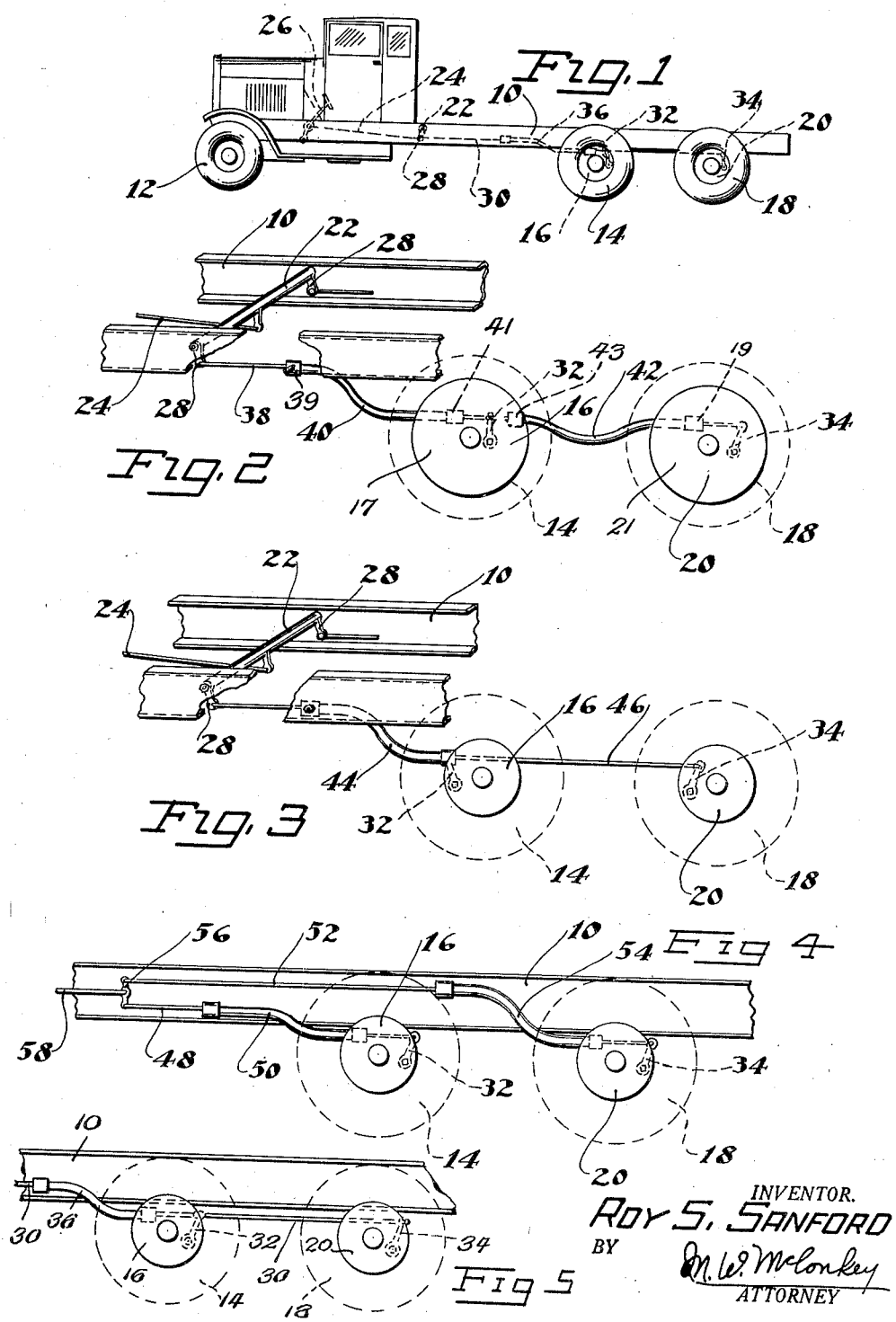

Patented Jan. 16, 1934

1,943,841

UNITED STATES PATENT OFFICE 1,943,841

BRAKE

Roy S. Sanford, South Bend, Ind., assignor to Bendix Brake Company, South Bend, Ind., a corporation of Illinois Application September 25, 1930
Serial No. 484,337

4 Claims. (Cl. 188—18)

This invention relates to brakes, and is illustrated as embodied in novel operating means for the brakes on the four rear wheels of a vehicle having six (or more) wheels. An object is to provide simplified operating means capable of use without extensive preliminary analysis and testing, and which can be used whether the four rear wheels are arranged in independently-sprung pairs or are all mounted on a carriage carrying the rear end of the chassis.

Having this in mind, the invention contemplates a novel arrangement utilizing flexible conduits containing the brake-operating mediums, and spanning the variable space between the chassis frame and the brakes. In one arrangement, the right or left conduit is secured at its rear end to the front one of the rear brakes, and a cable or the like in the conduit is connected to the brake-operating lever. The cable may then be continued to the rear one of the rear brakes, directly if the brakes (and wheels) are all mounted on the same carriage, or, if the forward and rearward sets of rear brakes and wheels are sprung separately, through a second flexible conduit secured to the two brakes at its opposite ends.

Alternatively, the power applied to the two brakes may be equalized, for example by attaching the cable to the operating lever (or equivalent) of the rearward brake and attaching the rear end of the conduit directly to the lever of the forward brake. If preferred, the equalization may be secured by running separate operating connections to the two brakes.

The above and other objects and features of the invention, including various novel and desirable structural details, will be apparent from the following description of the illustrative embodiments shown in the accompanying drawing, in which:

Figure 1 is a diagrammatic side elevation of a six-wheel chassis having a brake system embodying one form of my invention;

Figure 2 is a partial diagrammatic perspective of so much of the chassis as is necessary to show a second embodiment;

Figure 3 is a similar partial perspective showing a third embodiment;

Figure 4 is a partial side elevation showing a fourth embodiment; and

Figure 5 is a partial side elevation showing a portion of the brake system of Figure 1 on a larger scale.

The illustrated chassis includes a frame 10 supported in any desired usual manner on front wheels 12, which may or may not have brakes as desired, and on four (or more) rear driving wheels shown as including a forward pair 14 having brakes 16 and a rearward pair 18 having brakes 20. The rear wheels 14 and 18 may all be mounted on a single carriage, or the forward set 14 may be sprung independently of the rearward set 18, both arrangements being well known and not requiring description in detail. The brakes may be operated by means such as a cross-shaft 22 mounted on the chassis frame and connected by a rod or the like 24 to a pedal or equivalent 26.

In the arrangement of Figure 1 (more particularly adapted for use when the four rear wheels are all on one carriage), the shaft 22 has at its ends arms or levers 28 connected to flexible mediums such as cables 30 connected to the operating levers 32 of the forward brakes 16 and thence carried to the operating levers 34 of the rearward brakes 20. The portion of each cable 30 just ahead of its lever 32 is arranged in a flexible Bowden-type conduit 36 which compensates for spring deflections, and which has its forward end secured to the chassis frame and its rearward end to a portion of the brake 16 (e. g., to the backing plate). Inasmuch as the flexible conduit 36 is secured to a fixed point of the chassis and is secured to a portion of the brake, variations for spring deflection will flex the conduit, flexing therewith the cable within the conduit and inasmuch as the conduit does not vary in length, the effective length of the cable remains the same so that there are no variations of brake application due to spring deflection.

The arrangements of Figures 2 and 4 are suitable for use whether or not the sets of rear wheels are separately sprung.

In Figure 2, flexible cables or other operating medium 38 actuated by levers 28 are connected to levers 32 so as to operate brakes 16. The cables 38 are then connected to levers 34 so as to operate the brakes 20. The portions of the cables 38 ahead of levers 32 are arranged in flexible conduits 40 secured at their forward ends at 39 to the chassis frame and at their rear ends to brackets 41 secured to the backing plates 17 of the brakes 16. These conduits compensate for movement of the wheels 14 due to spring deflection. The portions of the cables 38 between the brakes 16 and 20 are arranged in conduits 42 secured at their forward ends to brackets 43 secured to the backing plates 17 of the brakes 16 and at their rearward ends to brackets 19 secured to the backing plates 21 of the brakes 20. These conduits 42 compensate for movements of wheels 18 due to spring deflections.

In Figure 3 the power applied to forward and rearward brakes is equalized by connecting to lever 32 the rear end of a conduit 44 secured to the chassis frame, and connecting to lever 34 the rear end of a cable 46 passing through the conduit 44 and connected at its forward end to lever 28. The tension on the cable 46 applies the brake 20, and the reaction on the conduit 44 applies the brake 16.

In the arrangement of Figure 4, there is a cable 48 arranged in a conduit 50 for brake 16, and a cable 52 arranged in a conduit 54 for brake 20. The forward ends of conduits 50 and 54 are secured to the chassis frame and their rearward ends are connected respectively to the brakes 16 and 20. The cables 48 and 52 are connected respectively at their rearward ends to levers 32 and 34, and are connected at their forward ends to an equalizer bar 56 operated by a connection 58 from lever 28 (not shown in this figure).

While several illustrative embodiments have been described in detail, it is not my intention to limit the scope of the invention to those particular embodiments, or otherwise than by the terms of the appended claims.

I claim:

1. A chassis having a frame and front wheels and at least two wheels having brakes at each side at its rear, in combination with operating means for the brakes including on each side of the chassis a flexible conduit attached to the frame at its forward end and secured adjacent one of the brakes at its rear end, and a brake-operating flexible medium arranged in said conduit and attached to at least two of the brakes on the same side.

2. A chassis having a frame and front wheels and at least two wheels having brakes at each side at its rear, in combination with operating means for the brakes including on each side of the chassis a flexible conduit attached to the frame at its forward end and secured adjacent one of the brakes at its rear end, and a brake-operating flexible cable passing through said conduit and attached to at least two of the brakes on the same side.

3. A chassis having a frame and front wheels and at least two wheels having brakes at each side at its rear, in combination with operating means for the brakes including on each side of the chassis a flexible conduit attached to the frame at its forward end and secured adjacent the forward one of said brakes, a second such conduit secured at its forward end adjacent said forward one of the rear brakes and secured at its rear end adjacent the rear one of said rear brakes, and a flexible brake-operating medium arranged in the conduits and operating both brakes.

4. A chassis having a frame and front wheels and at least two wheels having brakes at each side at its rear, in combination with operating means for the brakes including on each side of the chassis a flexible conduit attached to the frame at its forward end and secured adjacent the forward one of said brakes, and a flexible brake-operating medium arranged in the conduit and attached to at least two of the brakes on the same side for operating both brakes.

ROY S. SANFORD.